UNITED STATES PATENT OFFICE.

ANTON LOOSE, OF HERMSDORF, GERMANY, ASSIGNOR TO CHEMISCHE FABRIK AUF ACTIEN (VORM. E. SCHERING), OF BERLIN, GERMANY.

PROCESS FOR ACETYLATING CELLULOSE AND ITS PRODUCTS OF TRANSFORMATION.

1,069,445.  Specification of Letters Patent.  Patented Aug. 5, 1913.

No Drawing.  Application filed December 16, 1912.  Serial No. 736,988.

*To all whom it may concern:*

Be it known that I, ANTON LOOSE, doctor of philosophy, chemist, citizen of the German Empire, residing at Hermsdorf, near Berlin, Germany, have invented a new and useful Improvement in Processes for Acetylating Cellulose and Its Products of Transformation, of which the following is a specification.

According to this invention small quantities of sulfates of feeble basic inorganic derivatives from ammonia, as for instance sulfates of hydrazin or of hydroxylamin, are employed in the process of acetylating cellulose and its immediate products of transformation, such as hydrocellulose, cellulose hydrate, oxycellulose, and the like. Such addition allows the process not only to take place quickly and without the necessity of employing external heat, but the nearly colorless acetate solutions obtained are of very homogeneous and permanently high viscosity; such solutions are therefore very suitable for the manufacture of artificial silk, films and the like.

Example I: 20 parts of cellulose are impregnated with a solution of 2 parts of hydrazin sulfate, the dried mixture being then stirred with a mixture of 100 parts of glacial acetic acid and 100 parts of acetic anhydrid at normal temperature. The cellulose becomes quickly soft with evolution of heat, after four to six hours gelatinization is complete. The acetate obtained may be separated according to the usual methods by precipitation with water or the like.

Example II: 0.5 parts of hydroxylamin sulfate in a finely divided state is suspended in a mixture of 100 parts of glacial acetic acid and 100 parts of acetic anhydrid. Upon the addition of 20 parts of cellulose a quick reaction sets in, which according as the heat evolved is regulated produces within two to six hours a colorless homogeneous gelatin of high viscosity.

Of course in the preceding examples mixtures of the salts of both bases may be employed.

The cellulose acetate obtained according to this invention is insoluble in ethyl alcohol, methyl alcohol and in ethyl-acetate and is but slightly soluble in acetone. It is soluble in chloroform but in order to produce a clear solution the addition of alcohol is usually necessary.

I claim as my invention:

1. The process of producing cellulose acetate which consists in acetylating cellulose in the presence of a sulfate of a basic inorganic derivative of ammonia, substantially as set forth.

2. The process of producing cellulose acetate which consists in acetylating cellulose in the presence of hydrazin sulfate, substantially as set forth.

3. In the process of producing cellulose acetate the herein described step which consists in impregnating cellulose with hydrazin sulfate, substantially as set forth.

4. The process of producing cellulose acetate which consists in impregnating cellulose with hydrazin sulfate then stirring the same with glacial acetic acid and acetic anhydrid, and then separating the resulting cellulose acetate from the mixture, substantially as set forth.

In testimony whereof I have hereunto set my signature in the presence of two subscribing witnesses.

ANTON LOOSE.

Witnesses:
HENRY HASPER,
WOLDEMAR HAUPT.